Dec. 30, 1958  J. G. INGRES  2,866,318
BOOSTER BRAKE MECHANISM
Filed Sept. 28, 1956  2 Sheets-Sheet 1
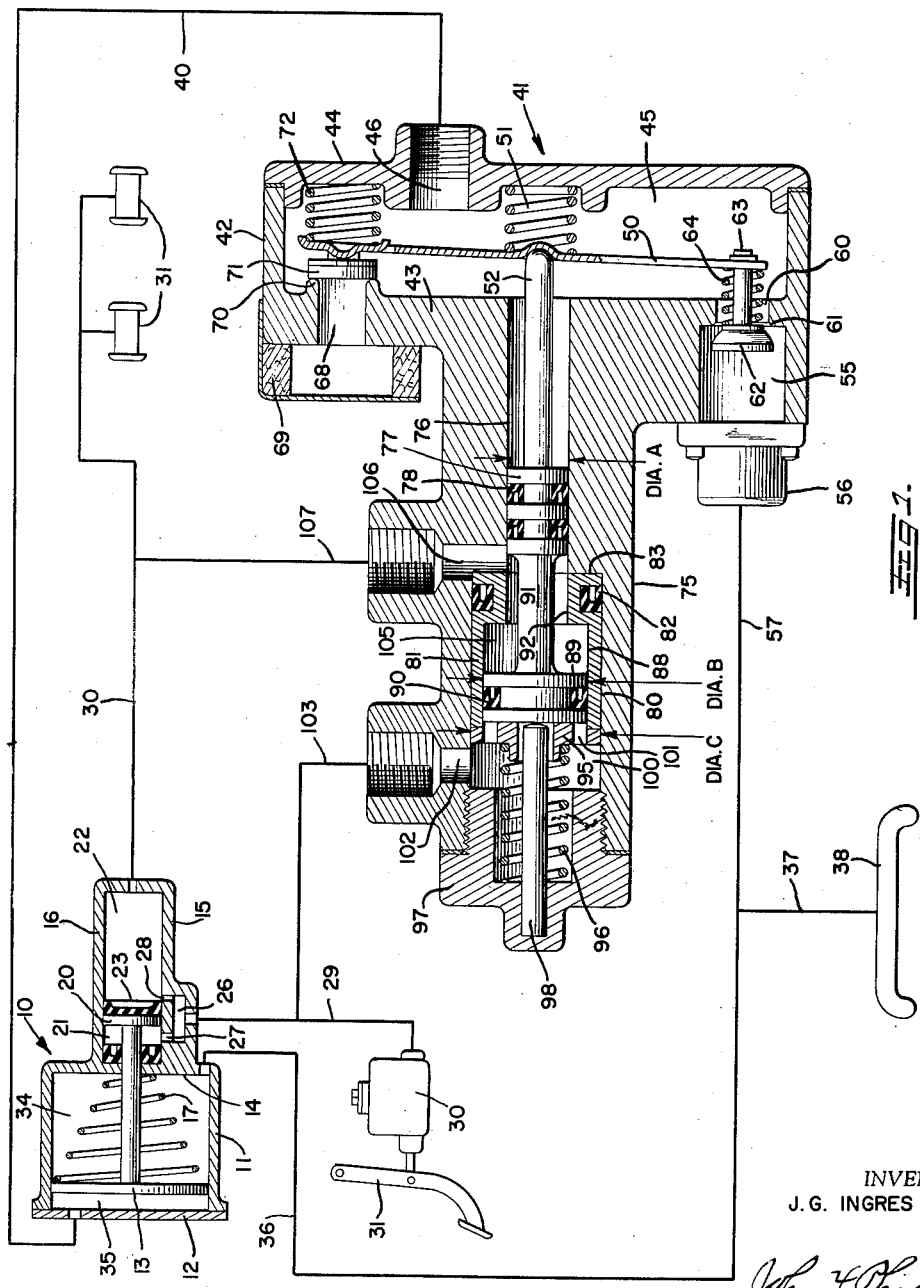
INVENTOR
J. G. INGRES
BY John F. Phillips
ATTORNEY Dec. 30, 1958    J. G. INGRES    2,866,318
BOOSTER BRAKE MECHANISM
Filed Sept. 28, 1956    2 Sheets-Sheet 2
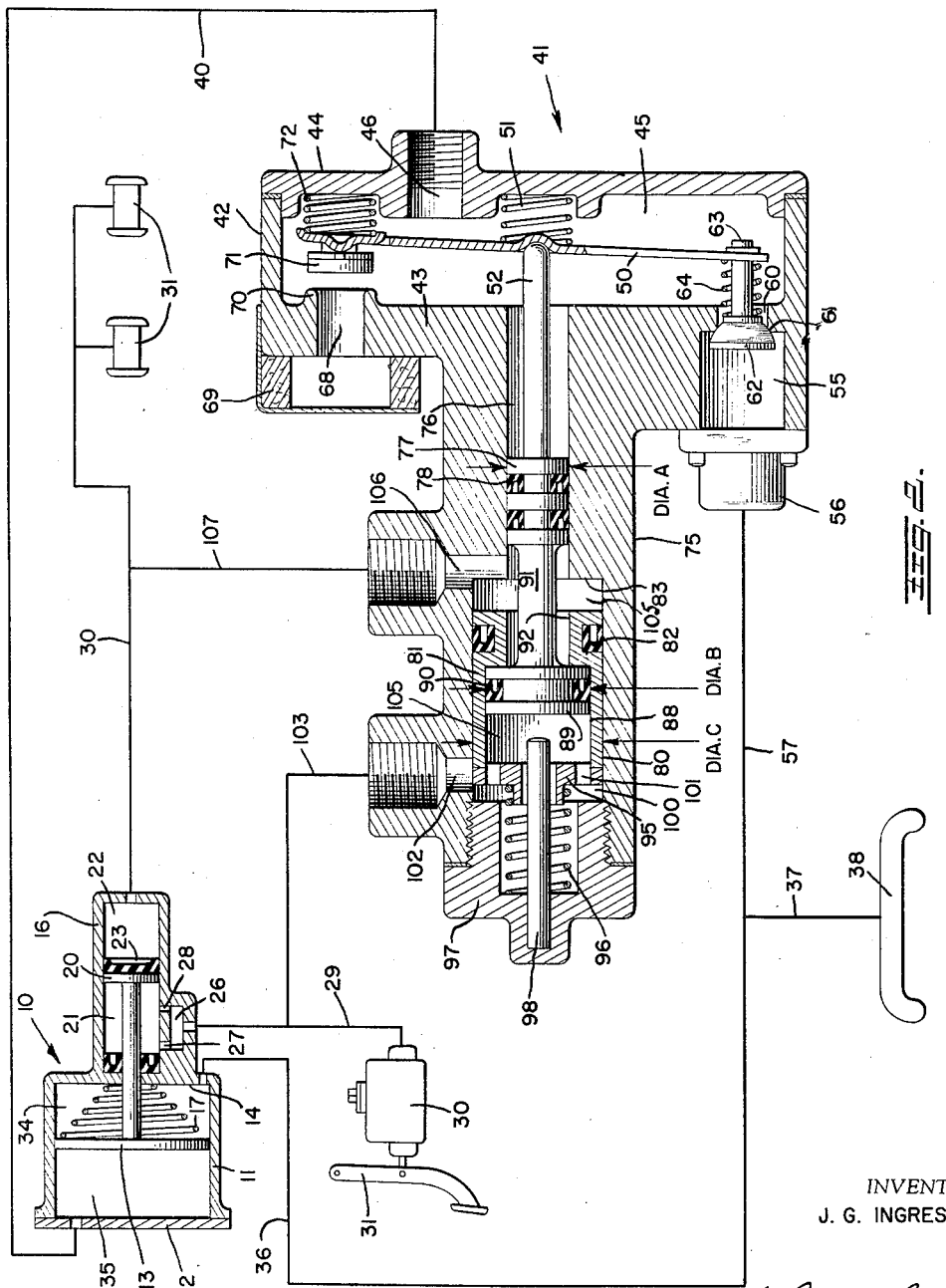
INVENTOR
J. G. INGRES
BY John F. Phillips
ATTORNEY

United States Patent Office 2,866,318
Patented Dec. 30, 1958

2,866,318

BOOSTER BRAKE MECHANISM

Jeannot G. Ingres, Birmingham, Mich., assignor to Kelsey-Hayes Company, a corporation of Delaware Application September 28, 1956, Serial No. 612,794

12 Claims. (Cl. 60—54.5)

This invention relates to a booster brake mechanism.

Earlier types of booster brake mechanisms were of such nature that initial operation of the brake pedal would displace hydraulic fluid against substantial resistance before the booster motors came into operation. This resistance would drop upon initial operation of the booster motor, and this resulted in "lumpy" operation of the brake pedal. It was then proposed to provide means whereby initial movement of the brake pedal would effect energization of the motor without utilizing any force applied to the brake pedal for displacing hydraulic fluid. Such an arrangement also was disadvantageous since it gave the operator the feeling, upon initial movement thereof, that the brake pedal was falling away from his foot. Still later constructions overcome this disadvantage by employing an interim reaction means for resisting movement of the brake pedal through the use of elastic fluid reaction diaphragms.

It is desirable in a booster brake mechanism to utilize direct hydraulic reactions against the brake pedal so that the operator feels a resistance proportional to brake application, and it is desirable to delay the application of such reaction without lumpiness and without the initial falling-away of the brake pedal, and the diaphragm reaction devices solved the problem to a substantial extent. However, it has been found desirable to employ hydraulic reaction throughout the range of booster brake operation, and it is an important object of the present invention to provide an apparatus wherein, after the booster motor starts to build up braking pressures in the brake lines, a direct hydraulic reaction against the brake pedal is provided, and to provide in conjunction therewith a means for applying progressively increasing hydraulic reaction against the pedal in the interim between initial movement of the brake pedal from its normal off position and the point at which direct hydraulic pressures are applied against the brake pedal after brake applying hydraulic pressures are generated.

A further object is to provide such an apparatus wherein a relatively "soft" initial movement of the brake pedal takes place without undue softness and wherein promptly upon the generation of brake line pressures higher than normal, progressively increasing hydraulic reactions are transmitted to the brake pedal.

A further object is to provide an apparatus of this character wherein a hydraulic fluid pressure responsive device transmits initial hydraulic reactions to the brake pedal, and wherein a supplementary hydraulic pressure responsive member comes into operation at a predetermined brake line pressure to provide a higher degree of reaction against the brake pedal.

A further object is to provide such a mechanism wherein the valve mechanism for controlling the booster motor is operable by pedal-displaced hydraulic fluid through the medium of a pressure responsive element, and wherein pedal-displaced fluid flows through the power operated master cylinder into the brake lines and back to the other side of the pressure responsive element so that such other side of the pressure responsive element is initially subjected to pedal-generated pressures and later to higher pressures generated in the brake lines to provide the desired hydraulic reaction.

A further object is to provide an apparatus of the character just described wherein a supplemental hydraulic pressure responsive element is biased to a normal position by a spring loaded to a predetermined extent to be overcome by predetermined hydraulic pressures in the brake lines, after which the supplemental pressure responsive element engages the first pressure responsive element to increase the hydraulic reaction transmitted to the brake pedal.

A further object is to provide a booster brake mechanism of the character outlined above which automatically provides two stages of hydraulic reaction, the second stage of reaction coming into operation upon actuation of the supplemental pressure responsive element referred to, and which actuation requires a small amount of fluid loss from the brake lines, and to so arrange the parts that such loss of fluid is exactly compensated for in the primary or brake pedal end of the system, thus preventing any slight dropping of the brake pedal at the point where the supplemental pressure responsive element comes into operation.

Other objects and advantages of the invention will become apparent during the course of the following description.

In the drawings I have shown one embodiment of the invention. In this showing:

Figure 1 is a sectional view showing the booster motor control valving and reaction means, the booster motor and associated elements being shown in diagrammatic section and the remaining elements of the system being diagrammatically illustrated, all of the parts being shown in normal positions; and Figure 2 is a similar view showing the parts in fully operative brake applying positions.

Referring to the drawings, the numeral 10 designates a booster motor as a whole comprising a cylinder 11 closed by a head 12 at one end thereof and having a piston 13 reciprocable therein. It will be apparent that the motor is only diagrammatically represented and may be of any desired type. The other end of the motor is closed by a head 14 shown as having an integral axially projecting housing 15 in which is formed a cylinder 16. A return spring 17 is arranged between the head 14 and piston 13 to bias the latter to its off position shown in Figure 1.

A plunger 20 reciprocates in the cylinder 16 and divides the latter to form a primary chamber 21 and a secondary chamber 22. The plunger 20 is provided with a flexible lipped seal 23 for the flow of fluid from the chamber 21 to the chamber 22 when pressure in the former is higher than pressure in the latter, as will become apparent.

The housing 15 is provided therein with a chamber 26 communicating respectively through ports 27 and 28 with the primary and secondary chambers 21 and 22. The chamber 26 communicates through a hydraulic line 29 with a conventional master cylinder 30 operable by a pedal 31, shown in the present instance as being of the hanging type. The port 28 is located adjacent the edge of the seal 23 when the parts are in the off positions shown, and it will be apparent that upon initial movement of the piston 13 and plunger 20, the port 28 will be closed. The port 28 is a compensating port for maintaining the proper supply of hydraulic fluid in the chamber 22 and in the brake lines 30 leading to the wheel cylinders 31, only two of which have been illustrated.

The piston 13 divides the cylinder 11 to form a constant pressure chamber 34 and a variable pressure chamber 35, the former of which communicates through lines 36 and 37 with a source of vacuum such as the intake manifold 38 of the vehicle engine. The chamber 35 is connected by a line 40 to a valve mechanism indicated as a whole by the numeral 41.

The valve mechanism 41 comprises a housing 42 formed by a body 43 and a cover plate 44 forming a control chamber 45. This chamber communicates through a port 46 with the line 40.

In the control chamber 45 is arranged a lever 50 the central portion of which is urged to the left, as viewed in the drawing, by a spring 51, and such portion of the lever is engaged by an operating rod 52 to operate the valve mechanism in a manner to be described.

The body 43 is provided with a chamber 55 connected through a nipple 56 with a line 57 tapped into the lines 36 and 37, and accordingly vacuum is always present in the chamber 55. A vacuum port 60 is connected between the chambers 45 and 55 and is provided with a valve seat 61 engageable by a normally open vacuum valve 62 having a stem 63 engaging one end of the lever 50. A spring 64 is arranged between the valve 62 and lever 50 to maintain the valve 62 spaced to its maximum extent from the lever 50, the stem 63 extending loosely through the lever 50 to permit relative movement of the valve 62 for the proper seating thereof.

Diametrically opposite the vacuum chamber 55, the body 43 is provided with an atmospheric port 68, and interposed between this port and the atmosphere is preferably arranged a suitable air cleaner 69. The inner end of the port 68 is provided with a valve seat 70 normally engaged by a valve 71 connected to the adjacent end of the lever 50, and a spring 72 urges the adjacent end of the lever 50 toward the seat 70 to normally maintain the valve 71 seated. The valves normally occupying the positions shown in Figure 1, it will be apparent that the chamber 45 is normally connected to the source of vacuum and disconnected from the atmosphere. Hence the motor chamber 35 is normally connected to vacuum to balance the vacuum in the chamber 34.

The body 43 is provided with an axial extension 75. This extension is provided with a bore 76 through which the stem 52 projects, and this stem carries a plunger 77 sealed as at 78 to prevent leakage of hydraulic fluid past the plunger 77 toward the right, for a reason which will become apparent.

Remote from the chamber 45, the axial extension 75 is provided with a larger bore 80 forming a cylinder in which is slidable a tubular piston 81. The right-hand end of this piston is sealed with respect to the bore 80 as at 82, and such end of the piston normally seats against the shoulder 83 at the right-hand end of the bore 80.

The piston 81 is provided with a bore 88 in which is arranged a plunger 89, sealed relative to the bore 88 as at 90. The plunger 89 is connected to the plunger 77 by a stem 91. The right-hand end or head portion of the piston 81 is provided with a bore 92 which may correspond in size to the bore 76 to communicate therewith.

The piston 81 is provided at its left-hand end with a cap 95. This cap need only seat against the piston 81 since it is maintained in position by a compression spring 96, engaging at one end against the cap 95 and seating at its other end against a nut 97 threaded into the axial extension 75. The nut 97 supports a rod 98 the end of which engages the plunger 89 to positively prevent movement of the latter beyond its normal position.

The bore 80, to the left of the cap 95, forms a hydraulic control chamber 100 which communicates with the adjacent end of the bore 88 through openings 101 formed in the cap 95, thereby subjecting the adjacent end of the plunger 89 to pressure in the chamber 100. This chamber communicates through a port 102 with a hydraulic line 103 tapped into the master cylinder outlet line 29.

The piston 81 forms with the plunger 89 and bore 80 a reaction chamber 105 which communicates through bore 92 with a port 106, and this port is connected by a hydraulic line 107 to the brake line 30. As will be further described below, action and reaction hydraulic forces are dependent upon the relative areas of the plungers 77 and 89 and the piston 81. For convenience, the areas of the elements just described are indicated in the drawings by the legends "Dia. A," "Dia. B," and "Dia. C." Obviously, these legends successively refer to the diameters of the plungers 77 and 89 and piston 81.

*Operation*

The parts normally occupy the positions shown in Figure 1. When the brakes are to be applied, the operator will depress the pedal 31 to displace fluid from the master cylinder 30 through line 29 into the chamber 26 and thence into the cylinder 22. This operation also displaces fluid through line 103 into the chamber 100 and through line 107 into the chamber 105.

At this stage in the operation of the device it will be obvious that pressures in the primary lines and associated chambers, that is lines 29 and 103 and chambers 21 and 100, will be equal to pressures in the secondary lines and chambers, that is, the lines 30 and 107 and chambers 22 and 105. There being greater effective area of the plunger 89 open to pressure in the chamber 100, it will be obvious that the plunger 89 and associated elements will be moved to the right in the drawings. Movement will be imparted by the stem 52 to the center of the lever 50 against the tension of the spring 51. The spring 72 will maintain the valve 71 seated, and the other end of the lever 50 will be moved to the right to seat the vacuum valve 62 and thus disconnect the chamber 45 from the chamber 55. No further movement of the latter end of the lever 50 can take place, and further movement imparted to the center of the lever will then unseat the valve 71, thus permitting air to flow into the chamber 45 and thence through line 40 into the variable pressure chamber 35 of the motor 10. The piston 13 will then be moved to the right and will immediately cut off communication between the chambers 22 and 26, the seal 23 moving across the port 28. In this connection, it is pointed out that the compensating port 28 is quite small. However, if fluid is displaced from the master cylinder 30 at a rate too great to flow through port 28, the fluid can flow through port 27 into chamber 21, thence past the lip of the cup 23 into the chamber 22, thus maintaining pressures approximately equal in the chambers 21 and 22 until the lip of the cup 23 moves across the port 28.

It will be apparent that immediately upon energization of the motor 10, pressure will become greater in the chamber 22 than in the chamber 21, hence greater in the chamber 105 than in the chamber 100. A reaction pressure thus will be promptly built up acting toward the left against the plunger 89, which reaction will be transmitted through chamber 100 and lines 103 and 29 to the master cylinder 21 to be felt by the operator.

The higher or secondary pressure in the chamber 105 acts on the plunger 89 over an area which is the area at Dia. B minus the area at Dia. A. The primary pressure acts on the left side of the plunger 89 through the area at Dia. B. Therefore, the reaction or boost ratio at this stage is $$\frac{\text{Area at Dia. B}}{\text{Area at Dia. B} - \text{Area at Dia. A}}$$

It will be apparent that as the pressure in the secondary end of the line builds up in the chamber 105, the hydraulic reaction against the pedal 31 will increase. This pressure will increase until the point is reached where there is sufficient force exerted against the right-hand end of the piston 81 to overcome the loading of the spring 96, at which time the plunger will move to the left, and the head of the piston 81 will engage the plunger 89 as shown in Figure 2. When this point in the operation occurs, the reaction or boost ratio becomes $$\frac{\text{Area at Dia. C}}{\text{Area at Dia. C} - \text{Area at Dia. A}}$$

In other words, when the point is reached where the piston or sleeve 81 moves to engage its head with the plunger 89, this plunger and the piston 81 become a pressure responsive unit subjected at the right-hand side thereof to secondary pressures over the area at Dia. C. Therefore, the apparatus functions immediately upon energization of the motor to provide hydraulic reaction against the foot pedal, and this reaction increases in a predetermined ratio until secondary pressures move the piston 81 into engagement with the plunger 89, whereupon a higher booster ratio becomes effective, as is desired. Therefore, the apparatus delays the application of relatively heavy hydraulic reactions, as is desirable, and in the interim between initial energization of the motor and the overcoming of the spring 96, there is a progressively increasing hydraulic reaction to smooth out the transition from zero reaction to the reaction of maximum ratio.

As the diameters at A, B and C can be varied over a wide range and the diameters at A and B can also be made almost equal, the booster can start out with a very high ratio between primary and secondary pressures, for example of the order of 5:1 to 10:1. As soon as a pressure is reached where the brake shoes are touching the drums, the secondary pressure becomes effective for moving the piston 81 toward the left to the position shown in Figure 2, whereupon the reaction ratio can be reduced, for example to 2:1 to 3:1, as is preferred in the stages of brake operation after the brake shoes have engaged with the drums.

The particular valving employed with the mechanism forms per se no part of the present invention, and movement of the unit comprising stems 52 and 91 and plungers 77 and 89 may be utilized for actuating any type of follow-up control valve mechanism for the motor 10. It also will be apparent that while the motor 10 has been diagrammatically shown as of the piston and cylinder vacuum-suspended type, it may be of the type which is air-suspended and operated by super-atmospheric pressure, or it may be an air-suspended bellows type motor. In the latter two cases, the chamber 55 would be open to the atmosphere, while the port 68 of the valve mechanism would be connected to a source of super-atmospheric pressure. Such variation in the motor type is too old and well known to require specific illustration.

Obviously, the compensating port 28 maintains balanced pressure throughout the primary and secondary parts of the system when the brakes are released, and serves also to provide for the replenishment of any fluid leaking from the secondary side of the system. While the seal 90 is effective to prevent any appreciable flow of fluid between chambers 100 and 105, it will be apparent that, during substantial brake applications, the pressure in the chamber 105 will be substantially greater than pressure in the chamber 100. If some slight seepage of fluid from the chamber 105 to the chamber 100 should occur past the seal 90 during a brake application, this minor leakage will slightly reduce the volume of fluid in the secondary side of the system. The fluid will leak back into the primary side of the system, and when the brakes are released, the loss of fluid in the secondary side of the system will be compensated for through port 28.

Assuming that the usual residual pressure valve is used at the outlet of the master cylinder 30, there will be such residual pressure present in the chambers 100 and 105. Thus there will be a slight net pressure tending to move the plunger 89 toward the right, but this pressure is overcome by the spring 51 which biases the plunger 89 to the normal position shown in Figure 1.

It will be noted that if the tubular piston 81 were omitted or fixed in the position shown in Figure 1, the device would still operate to provide successively increasing hydraulic reactions to movement of the pedal 31 since pressures in the secondary portion of the system will be much higher than pressures in the primary portion. It is much preferred from a practical standpoint, however, to utilize the tubular piston 81 to provide for a hydraulic reaction of higher ratio beginning, as stated above, preferably from the point of initial engagement of the brake shoes with the drums. When this point in the operation occurs, there is a rapid rise in pressure in the secondary lines 30 and 107. This is the point at which actual braking of the vehicle begins and it is the point at which the tubular piston 81 moves to the left under the influence of increasing pressures in the chamber 105.

When the tubular piston 81 moves to the left under the influence of increasing pressures in the line 107, some little hydraulic fluid must flow from the brake lines 30 through line 107 to accomplish such movement. This slight loss of fluid from the brake lines can take place only by a movement of the plunger 20 toward the right to reduce the capacity of the chamber 22 to a volumetric extent corresponding to the fluid required for displacing the tubular piston 81. Such movement of the plunger 20 does not increase the degree of brake application, and it takes place only by correspondingly expanding the capacity of the primary chamber 21.

In the absence of the functioning of the present device as further referred to below, an expansion of the chamber 21 could take place only by the displacement of fluid from the master cylinder 30, and this in turn would be accomplished only by an additional increment of movement of the brake pedal 31. Such increment of movement would be a "false" movement so far as the operator is concerned, since it would not increase the brake application. In other words, at the point at which the tubular piston 81 moves to the position shown in Figure 2, there would be an objectionable slight falling-away of the pedal 31. This fault is present in prior constructions which have been employed to provide two stages of hydraulic reaction.

An examination of Figures 1 and 2 will make it clear that the tubular piston 81 has equal effective areas exposed to both the primary and secondary ends of the system as represented respectively in the chamber 100, and in the chamber 105, it being apparent that this chamber is the entire chamber to the right of the plunger 89. The cap 95 has pressure equalized at both sides thereof except in the outermost area forming a continuation, and in effect a part, of the tubular piston 81, and it is such area of the secondary reaction member which is subject to pressure in the chamber 100. In the chamber 105, the internal flange on the tubular piston 81 which forms the bore 92 has its opposite ends exposed to balancing pressures except that at the right-hand end of the tubular piston 81, there is a net area open to pressure in the port 106 equal to the area of the secondary reaction member open to the chamber 100. Therefore, when the secondary reaction member 81 moves to the left, the capacity of the chamber 105 (Figure 2) is expanded to the same extent that the capacity of the chamber 100 is decreased. Therefore, the loss of fluid through the line 107 to move the member 81 to the left is exactly compensated for by the displacement of fluid from the chamber 100 through line 103 into the primary chamber 21. Thus it will be apparent that the secondary reaction means comes into operation without requiring displacement of fluid from the master cylinder 30, thereby eliminating any falling-away of the pedal 31 at such point in the operation of the system.

It is to be understood that the form of the invention shown and described is to be taken as a preferred example of the same and that various changes in the shape, size and arrangement of the parts may be made as do not depart from the spirit of the invention or the scope of the appended claims.

I claim:
1. A hydraulic booster system comprising a hydraulic pressure booster device including a hydraulic chamber and a fluid displacing plunger movable thereinto, a fluid pressure motor having a pressure responsive unit connected to said plunger, a valve mechanism having connection with sources of relatively high and low pressures and with said motor, a hydraulic fluid pressure responsive member connected to said valve mechanism, a control chamber at one side of said hydraulic pressure responsive member, a pedal operable master cylinder connected to such chamber to move said hydraulic pressure responsive member and operate said valve mechanism to energize said motor, a reaction chamber to pressure in which the other side of said hydraulic pressure responsive member is exposed, said reaction chamber communicating with said hydraulic chamber whereby the building-up of pressure in the latter chamber causes pressures in said reaction chamber to oppose pressures in said control chamber in a predetermined ratio thereto, and means in said reaction chamber engageable with said hydraulic fluid pressure responsive member when pressures in said reaction chamber increase to a predetermined point for increasing the reaction pressure in said reaction chamber affecting said fluid pressure responsive member in proportion to the pressure in said control chamber.

2. A hydraulic booster system comprising a hydraulic pressure booster device including a hydraulic chamber and a fluid displacing plunger movable thereinto, a motor having a power operable unit connected to said plunger, a control mechanism connected to said motor and to a source of power and having a normal position from which it is movable to energize said motor, a control cylinder, a hydraulic pressure responsive member in said control cylinder dividing it to form a control chamber and a reaction chamber and connected to said control mechanism, a pedal operable master cylinder, a fluid connection between said master cylinder and said control chamber, a fluid connection establishing fixed communication between said reaction chamber and said hydraulic chamber, said hydraulic pressure responsive member having a greater area exposed to pressure in said control chamber than in said reaction chamber, and means in said cylinder responsive to a predetermined increase in pressure in said reaction chamber for relatively increasing the effective area of said hydraulic pressure responsive member to pressures in said reaction chamber when such pressures increase to a predetermined point.

3. A hydraulic booster system comprising a hydraulic pressure booster device including a hydraulic chamber and a fluid displacing plunger movable thereinto, a motor having a power operable unit connected to said plunger, a control mechanism connected to said motor and to a source of power and having a normal position from which it is movable to energize said motor, a control cylinder, a tubular piston in said control cylinder, a hydraulic pressure responsive piston slidable in said tubular piston and dividing said cylinder to form a control chamber and a reaction chamber, a pedal operable master cylinder, a fluid connection between said master cylinder and said control chamber, a fluid connection between said hydraulic chamber and said reaction chamber, and means connected to said tubular piston for rendering it effective to engage said hydraulic pressure responsive piston to increase the effective area thereof subject to pressures in said reaction chamber only when such pressures increase to a predetermined point.

4. A hydraulic booster system comprising a hydraulic pressure booster device including a hydraulic chamber and a fluid displacing plunger movable thereinto, a motor having a power operable unit connected to said plunger, a control mechanism connected to said motor and to a source of power and having a normal position from which it is movable to energize said motor, a control cylinder, a tubular piston in said control cylinder, a hydraulic pressure responsive piston slidable in said tubular piston and dividing said cylinder to form a control chamber and a reaction chamber, a pedal operable master cylinder, a fluid connection between said master cylinder and said control chamber, a fluid connection between said hydraulic chamber and said reaction chamber, said tubular piston having a portion in said reaction chamber provided with a shoulder, and a spring engaging said tubular piston and normally biasing it to an inoperative position with said shoulder spaced from said hydraulic pressure responsive piston, said tubular piston having an end in said reaction chamber exposed to pressures therein whereby when such pressures increase to a predetermined point, said spring will be overcome and said shoulder will move into engagement with said pressure responsive piston.

5. A hydraulic booster system comprising a hydraulic pressure booster device including a hydraulic cylinder, a plunger in said cylinder dividing it to form a primary pressure chamber and a secondary pressure chamber, the latter of which has connection with a device to be operated, a fluid pressure motor having a pressure responsive unit connected to said plunger, a valve mechanism connected between said motor and sources of relatively high and low pressures and normally balancing pressures on opposite sides of said pressure responsive unit, said valve mechanism being movable to unbalance pressures on opposite sides of said pressure responsive unit, a control cylinder having a hydraulic pressure responsive member dividing it to form a control chamber and a reaction chamber and connected to said valve mechanism, a pedal operable master cylinder in fixed communication with said primary chamber and with said control chamber whereby operation of said master cylinder increases pressures in said primary chamber to exert a force against said plunger and in said control chamber to move said hydraulic pressure responsive member, means establishing fixed communication between said reaction chamber and said secondary chamber, said hydraulic pressure responsive member having a greater effective area exposed to pressures in said control chamber than in said reaction chamber, and means in said control cylinder and subject to a predetermined increase in pressure in said reaction chamber above a predetermined point for increasing the effective area of said hydraulic pressure responsive member to pressures in said reaction chamber.

6. A hydraulic booster system comprising a hydraulic pressure booster device including a hydraulic cylinder, a plunger in said cylinder dividing it to form a primary pressure chamber and a secondary pressure chamber, the latter of which has connection with a device to be operated, a fluid pressure motor having a pressure responsive unit connected to said plunger, a valve mechanism connected between said motor and sources of relatively high and low pressures and normally balancing pressures on opposite sides of said pressure responsive unit, said valve mechanism being movable to unbalance pressures on opposite sides of said pressure responsive unit, a control cylinder having a hydraulic pressure responsive member dividing it to form a control chamber and a reaction chamber and connected to said valve mechanism, a pedal operable master cylinder in fixed communication with said primary chamber and with said control chamber whereby operation of said master cylinder increases pressures in said primary chamber to exert a force against said plunger and in said control chamber to move said hydraulic pressure responsive member, means establishing fixed communication between said reaction chamber and said secondary chamber, said hydraulic pressure responsive member having a greater effective area exposed to pressures in said control chamber than in said reaction chamber, a tubular piston slidable in said control cylinder and in which said hydraulic pressure responsive member is slidable, said tubular piston having an end in said reaction chamber subject to pressures therein and being provided with a shoulder having a normal position spaced from said hydraulic pressure responsive member, and a spring engaging said tubular piston and normally biasing said shoulder to its normal position whereby, upon a predetermined increase in pressure in said reaction chamber, said spring will be overcome and said shoulder will be moved into engagement with said hydraulic pressure responsive member to increase the effective area thereof subject to pressures in said reaction chamber.

7. A hydraulic booster system comprising a cylinder having a fluid displacing plunger movable therein and dividing said cylinder to form a primary pressure chamber and a secondary pressure chamber, a fluid pressure motor having a pressure responsive unit connected to said plunger, a valve mechanism having connection with sources of relatively high and low pressures and with said motor, a body having a bore therein, a reaction sleeve slidable in said bore and a valve operating plunger slidable in said sleeve and connected to said valve mechanism, said sleeve and said valve operating plunger dividing said bore to provide a control chamber and a reaction chamber, a pedal operable master cylinder connected to said primary chamber and to said control chamber, fluid displaced in said control chamber by said master cylinder moving said valve operating plunger to operate said valve mechanism to energize said motor, said reaction chamber being connected to said secondary chamber to subject said sleeve to pressures in said secondary chamber, and means biasing said sleeve to a normal position spaced from said valve operating plunger whereby, when pressures in said reaction chamber increase to a predetermined point, said sleeve will engage said valve operating plunger to oppose valve operating movement thereof.

8. A hydraulic booster sysetm comprising a cylinder having a fluid displacing plunger therein dividing it to form a primary chamber and a secondary chamber, a fluid pressure motor having a pressure responsive unit connected to said plunger, a valve mechanism having connection with sources of relatively high and low pressures and with said motor, a body having a bore therein, a secondary reaction member slidable in said bore, a primary reaction member slidable in said secondary reaction member and cooperating therewith to divide said bore to form control and reaction chambers in opposite ends thereof, said primary reaction member being connected to said valve mechanism and having a greater area exposed to pressure in said control chamber than in said reaction chamber, a pedal operable master cylinder connected to said primary chamber and to said control chamber whereby displacement of fluid from said master cylinder into said control chamber moves said primary reaction device to actuate said valve mechanism to energize said motor, said reaction chamber being connected to said secondary chamber, and means biasing said secondary reaction device to a normal position spaced from said primary reaction member whereby, when pressure in said reaction chamber increases to a predetermined point, said biasing means will be overcome and said secondary reaction member will be moved into engagement with said primary reaction member to increase hydraulic opposition to movement of the latter for operating said valve mechanism.

9. A system according to claim 8 wherein said secondary reaction member has equal effective areas exposed to said control chamber and said reaction chamber whereby movement of said secondary reaction member to engage said primary reaction member increases the capacity of said reaction chamber and decreases the capacity of said control chamber to the same extent.

10. A hydraulic booster system comprising a hydraulic chamber having a fluid displacing plunger movable thereinto, a motor having a power operable unit connected to said plunger, a control mechanism connected to said motor and to a source of power and having a normal position from which it is movable to energize said motor, a control chamber and a reaction chamber, a primary reaction device having a surface exposed to pressure in said control chamber and a smaller surface exposed to pressure in said reaction chamber, said reaction chamber being connected to said hydraulic chamber, a pedal operable master cylinder having fluid connection with said control chamber to displace fluid thereinto to move said primary reaction device and actuate said control mechanism, a secondary reaction device having a normal position in which it has a portion arranged in the path of travel of and spaced from said primary reaction device, said secondary reaction device having a surface exposed to pressure in said reaction chamber, and means biasing said secondary reaction device to said normal position whereby, when pressure in said reaction chamber increases to a predetermined point, said biasing means will be overcome and said portion of said secondary reaction device will engage said primary reaction device to increase opposition to movement thereof by fluid displaced from said master cylinder into said control chamber.

11. A hydraulic booster system comprising a cylinder having a fluid displacing plunger movable therein and dividing said cylinder to form a primary pressure chamber and a secondary pressure chamber, a motor having a power operable unit connected to said plunger, a control mechanism connected to said motor and to a source of power and having a normal position from which it is movable to energize said motor, a control chamber and a reaction chamber, a primary reaction device connected to said control mechanism and having a surface exposed to pressure in said control chamber and a smaller surface exposed to pressure in said reaction chamber, said reaction chamber being connected to said secondary chamber, a pedal operable master cylinder having fluid connection with said primary chamber and with said control chamber to displace fluid into said control chamber to move said primary reaction device to actuate said control mechanism, a secondary reaction device having a normal position, said reaction devices being movable in parallel relation and having relatively overlapping portions spaced from each other when said secondary reaction device is in said normal position, said secondary reaction device having surfaces exposed to pressure in said control and reaction chambers, and means biasing said secondary reaction device to said normal position whereby, when pressure in said reaction chamber increases to a predetermined point, said biasing means will be overcome and said portions of said reaction devices will be engaged with each other and said secondary reaction device will increasingly oppose opposition to movement of said primary reaction device by fluid displaced from said master cylinder into said control chamber.

12. A system according to claim 11 wherein said surfaces of said secondary reaction device exposed to pressures in said control and reaction chambers are of equal effective areas whereby movement of said secondary reaction device to engage said primary reaction device increases the capacity of said reaction chamber and decreases the capacity of said control chamber to the same extent.

References Cited in the file of this patent
UNITED STATES PATENTS

| | | |
|---|---|---|
| 2,383,682 | Price | Aug. 28, 1945 |
| 2,448,464 | Rockwell | Aug. 31, 1948 |
| 2,756,845 | Banker | July 31, 1956 |
| 2,787,122 | Price et al. | Apr. 2, 1957 |